April 13, 1965  E. M. ALISAUSKIS  3,177,775
AUTOMATIC DRAW BAR MECHANISM FOR MACHINE TOOL SPINDLE
Filed March 28, 1963  2 Sheets-Sheet 1

INVENTOR.
EDWARD M. ALISAUSKIS
BY Brown, Jackson
Boettcher & Dienner
ATTYS.

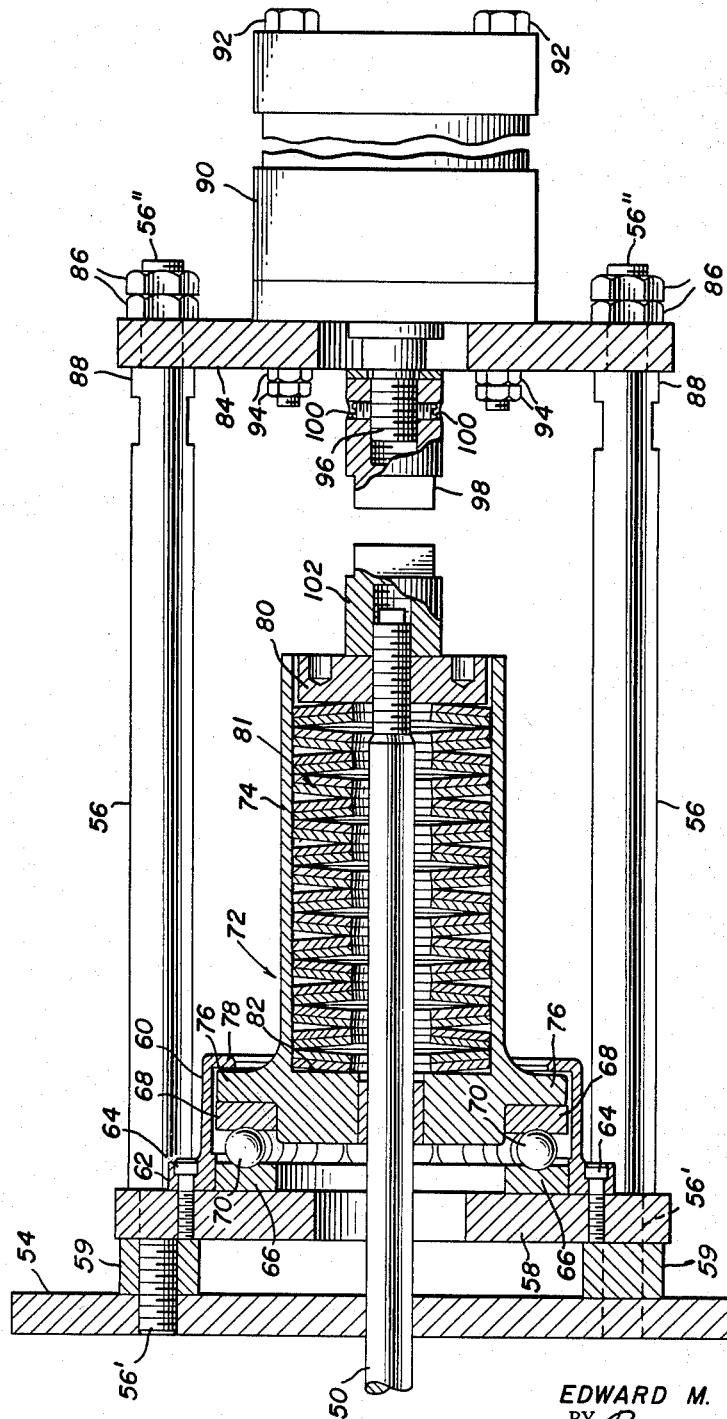

United States Patent Office 3,177,775
Patented Apr. 13, 1965

3,177,775
AUTOMATIC DRAW BAR MECHANISM FOR
MACHINE TOOL SPINDLE
Edward M. Alisauskis, Berwyn, Ill., assignor to Scully-
Anthony Corporation, La Grange, Ill., a corporation
of Illinois
Filed Mar. 28, 1963, Ser. No. 268,716
7 Claims. (Cl. 90—11)

The present invention relates to an automatic draw bar mechanism for a machine tool spindle, which mechanism is adapted to cooperate with a rearwardly projecting knob or the like on a tool holder of the type having a tapered shank so as to engage the knob and pull the tool holder tightly into a tapered spindle socket. The invention also relates to ejecting means associated with the draw bar mechanism for abutting the knob on the tool holder to assist in the release of the latter from the tapered socket.

The draw bar mechanism of the present invention is well suited for use with a machine tool which is equipped with an automatic tool changing system, whereby the tool holder may be automatically inserted loosely into the machine tool socket and the draw bar mechanism actuated to pull the holder tightly into the socket and hold it therein. However, the mechanism of this invention is also suited for use with other types of machine tools where a tool holder is loaded manually into a tapered spindle socket.

It is an object of the present invention to provide an improved automatic draw bar mechanism including collet means adapted to engage a projecting knob or the like at the rear of a tool holder and pull the holder axially into a tapered socket member.

A further object of the invention is to provide a draw bar mechanism of the above-mentioned type having improved actuating means including spring means for actuating an associated collet to closed position and non-rotatable piston and cylinder means for actuating the collet to open position.

Still another object of the invention is to provide a draw bar mechanism as last above-mentioned including ejecting means for aiding in the release of a tool holder which has been seated in a tapered spindle socket by the draw bar mechanism.

Figure 1:
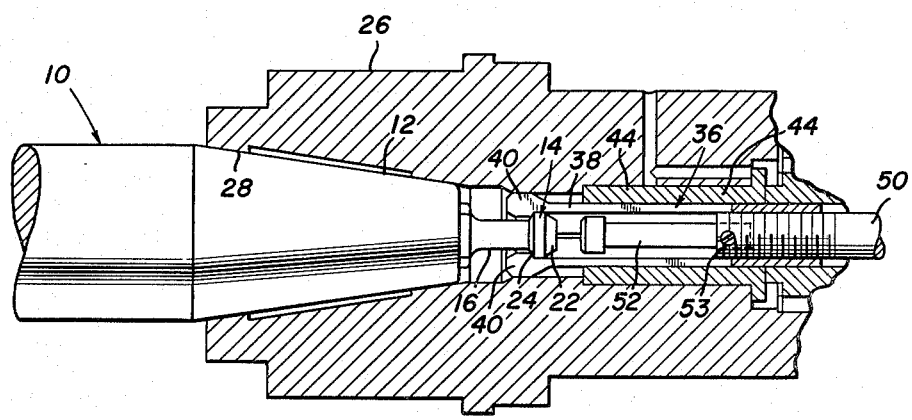
Figure 2:
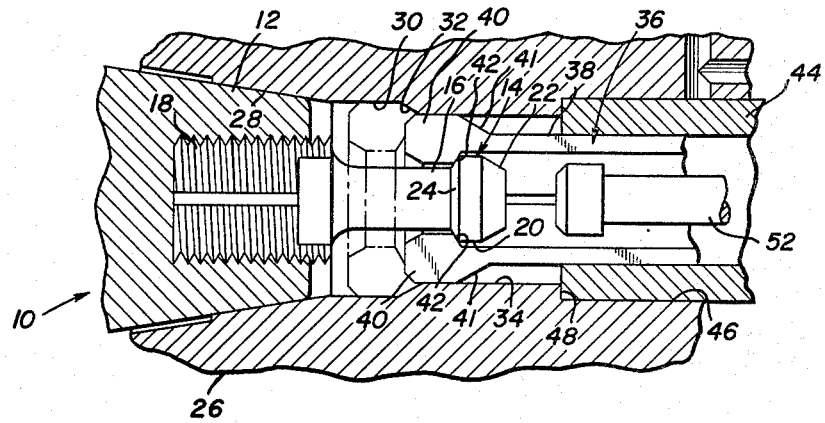

Other advantages and uses of my invention will be apparent, or become so, as I describe my invention in greater detail in conjunction with the accompanying drawings in which:

FIGURE 1 is a fragmentary elevational view, partly in section, showing a tool holder having a tapered shank and a rearwardly projecting knob thereon mounted in a tapered spindle socket and held seated therein by collet means which forms a part of an automatic draw bar mechanism constructed in accordance with the present invention;

FIGURE 2 is an enlarged fragmentary elevational view, partly in section, showing certain portions of FIGURE 1 in greater detail, and showing the collet means in solid lines in its closed position and in dash-dot lines in its forward or open position; and FIGURE 3 is an elevational view, partly in section and partly broken away, showing mechanism for actuating the collet means of FIGURE 1 between its axially forward open position and its axially rearward closed position, and may be viewed alongside FIGURE 1 for a substantially complete showing of the draw bar mechanism of the present invention.

Referring now to the drawings, there is shown in FIGURE 1 a fragmentary portion of a tool holder 10 having a tapered shank portion 12 and having a knob member 14 projecting rearwardly from the rear end of the shank. As best shown in FIGURE 2, the knob 14 has integral therewith a rod 16 which has its end threaded into an adapter 18 which in turn is threaded into the rear end of the tapered shank 12 of the tool holder. The knob 14 has an intermediate cylindrical portion 20 and is beveled on either side thereof to provide a frusto-conical nose portion 22 and also a frusto-conical shoulder 24 adjacent the rod portion 16.

It should be understood that when reference is made herein and in the appended claims to a "tool holder," such term should be interpreted to include tools, tool holders, and work pieces, since it will be readily apparent that a projecting knob member such as the knob 14 which is carried by the tool holder 10 may be provided directly on a tool or on a work piece which is to be held in a tapered socket.

A rotatable machine tool spindle 26 is provided with a tapered socket 28 adapted to receive the tapered shank portion 12 of the tool holder. It will be seen that the inner end of the tapered socket 28 communicates with a substantially cylindrical bore section 30 which terminates at a frusto-conical shoulder 32 extending into a reduced diameter bore 34.

A split collet member 36 is provided to cooperate with the knob 14 on the tool holder 10. The collet 36 comprises six radially flexible collet fingers 38 each having an enlarged head portion 40 adapted to engage the knob 14. Thus, each finger head portion 40 is formed with an internal tapered shoulder 42 adapted to bear against the frusto-conical shoulder 24 formed on the knob 14. It will be seen that the taper of each internal shoulder 42 is substantially the same as the taper of the frusto-conical shoulder 24.

The spring fingers 38 are biased radially outwardly to an open position and are acted on by the internal spindle wall in order to move the fingers radially inwardly to a closed position. Thus, when the collet 36 is moved to its axially forward position, the collet fingers 38 will expand radially outwardly to the open positions shown in dash-dot lines in FIGURE 2, wherein the enlarged head portions 40 will bear against the cylindrical section 30 of the spindle wall. In the latter position, the head portions 40 will be sufficiently spread apart to permit the tool holder 10 to be manually or automatically inserted into the tapered socket 28 with the knob portion 14 projecting axially rearwardly of the heads 40.

In order to pull the tool holder 10 tightly into the socket 28 and hold it therein, the collet 36 is moved axially rearwardly, whereupon the head portions 40 are cammed radially inwardly by engagement of tapered surfaces 41 thereon with the frusto-conical internal spindle shoulder 32. In this manner the tapered shoulders 42 on the heads engage against the frusto-conical shoulder 24 on the knob 14 and cause the collet to thus grip the knob and pull the tool holder 10 rearwardly into the socket. As the collet 36 is moved rearwardly, the enlarged head portions 40 ride freely along the wall of the reduced diameter bore 34, which maintains the fingers 38 in their closed positions as shown in solid lines in FIGURE 2.

In the foregoing manner, the tool holder 10 is pulled tightly into the tapered socket 28 and held seated therein by whatever axial force is applied to the collet 36 to draw the latter rearwardly. It will be seen that the collet is mounted in a bearing member 44 in which it is adapted to slide axially, the bearing being fixedly mounted within a bore 46 in the spindle 26 so as to abut against a shoulder 48.

A draw bar 50 has its forward end threaded into the rear of the collet 36 so as to be fixedly connected thereto and thereby adapted to move the collet between its axially forward and rearward positions. A cap screw 52 is threaded into the forward end of the draw bar and locked thereon by a pin 53 so as to project a predetermined distance therefrom and serve as an ejector member, as will be more fully described hereinafter.

FIGURE 3 shows the rear end of the draw bar 50, and associated actuating mechanism, which will now be described. There is shown a stationary rear end plate 54 of a machine tool, and four supporting rods 56 (two of which are illustrated) having reduced diameter threaded end portions 56' which are threaded into the plate 54 so as to secure the rods thereto. The end portions of the four rods 56 extend through corresponding apertures in a thrust plate 58 so as to support the latter, a spacer 59 being mounted on the end portion of each rod between the end plate 54 and the thrust plate.

A bearing retainer 60 is provided with a peripheral flange 62 whereby the retainer is secured to the thrust plate 58 by a plurality of cap screws 64. A thrust bearing housed within the retainer 60 comprises forward and rear race members 66 and 68 between which are disposed a plurality of balls 70. A rotatable spring housing 72 includes a tubular portion 74 and a forward peripheral flange 76 which extends radially outwardly so as to be adapted to bear against the thrust bearing race member 68 during normal operation of the mechanism being described. The bearing retainer 60 has a radially inwardly projecting lip 78 which overlies the flange 76 on the spring housing so as to serve as a retainer for the latter.

The rear end of the draw bar 50 has a nut 80 threaded thereon, and a plurality of Belleville spring washers 81 are disposed within the tubular portion 74 of the spring housing 72 between the nut 80 and a wall 82 at the forward end of the housing. It will thus be understood that the springs 81 act upon the nut 80 to bias the draw bar 50 rearwardly and thus bias the associated collet 36 toward its rearward closed position.

A rear mounting plate 84 is provided with four apertures to receive corresponding reduced diameter threaded rear end portions 56'' of the four support rods 56, whereby the plate 84 is mounted on the ends of the rods and secured thereto by a plurality of nuts 86. The mounting plate 84 bears against shoulders 88 on the support rods so as to be held in a predetermined axial position relative to the rods.

A hydraulic cylinder 90 is mounted against the rear face of the plate 84 by four bolts 92 which extend through a portion of the cylinder body and through the plate and are secured by a plurality of nuts 94. A piston rod 96 adapted to have a stroke of one inch projects forwardly from the cylinder 90 and carries a cap 98 which is threaded thereon and adjustably held in position by a plurality of set screws 100. A similar cap 102 is threaded on the extreme rear end of the draw bar 50 which projects rearwardly through the spring nut 80. It will be understood that as the piston rod 96 moves forwardly through its stroke, the piston cap 98 will engage the draw bar cap 102 and move the draw bar 50 forwardly so as to move the collet 36 to its open position as shown in dash-dot lines in FIGURE 2. It will also be noted that the piston cap 98 can be adjusted axially so that the stroke of the draw bar 50 can be varied even though the piston 96 has a fixed stroke.

The operation of the automatic draw bar mechanism of the present invention will now be described. If it be assumed that an axial stroke of 7/16 inch is desired for the collet 36, and that the stroke of the piston 96 is one inch, then when the draw bar 50 is in its rearward position with a tool holder 10 being held by the collet 36, the spacing between the piston cap 98 and the draw bar cap 102 as shown in FIGURE 3 must be 9/16 inch. In this respect, it should be understood that while the springs 81 are shown compressed in FIGURE 3, they are preferably designed so that when not under load they will expand axially a distance less than 9/16 inch. Accordingly, if the piston 96 is in its retracted position as shown in FIGURE 3, and there is no tool holder in the socket 28, the draw bar cap 102 will not engage the spindle cap 98.

In order to condition the collet 36 to receive a tool holder, pressure supply means (not shown) is actuated to move the piston 96 through its one inch stroke to its forward position. Accordingly, after the piston has moved a predetermined portion of its stroke, such as 9/16 inch in the example mentioned above, the piston cap 98 will engage the draw bar cap 102 and move the draw bar 50 forwardly 7/16 inch. In this manner, the collet is moved to its forward position as shown in dash-dot lines in FIGURE 2, permitting the collet fingers 38 to expand radially outwardly.

A tool holder such as the holder 10 is then inserted into the tapered socket 28 so that the knob 14 thereon will project into the collet 36. The piston 96 is then returned to its retracted position through operation of the pressure supply means, whereby the Belleville spring washers 81 are permitted to move the draw bar 50 axially rearwardly to close the collet fingers 38 about the knob 14. It will be noted that when the collet fingers are in closed positions as shown in solid lines in FIGURE 2, there is clearance between the enlarged head portions 40 and the rod 16 which carries the knob 14. Accordingly, the enlarged head portions do not grip the rod 16, but they do engage against the surface 24 on the knob to pull the tool holder tightly into the tapered socket. The system described is a fail-safe system in that the collet 36 is held in closed position by the springs 81 and will not be accidently open in the event pressure is lost in the hydraulic system.

In order to open the collet 36, pressure is supplied to the cylinder 90 to move the piston 98 forwardly as previously described. If it be assumed as stated above that the desired stroke of the collet is 7/16 inch, then the end of the cap screw 52 which projects forwardly from the draw bar 50 may be spaced slightly less than such distance from the rear face of the knob 14 when the parts are positioned as shown in FIGURE 1. For example, the cap screw 52 may be spaced 13/32 from the knob 14, so that when the draw bar is moved forwardly to open the collet, the cap screw will abut the knob 14 and assist in the ejection of the tool holder 10 from the socket 28. In the preferred embodiment being described, the tapers on the socket 28 and on the shank 12 of the tool holder are approximately 15 degrees, which is not normally considered a locking taper, but it has nevertheless been found desirable to provide the described ejecting means.

It will be understood from FIGURE 3 that when a tool holder 10 is held seated in the spindle 26 and the spindle is operating, the spindle will rotate along with the draw bar 50 and the spring housing assembly 72, whereas the remainder of the structure shown in FIGURE 3 including the piston and cylinder assembly will remain stationary. The thrust bearing means 66, 68, 70 permits rotation of the spring housing 72 inasmuch as the housing will be held against the race member 68 due to the pull on the draw bar 50. It should be noted that it is an advantage of the arrangement described herein that the cylinder 90 is stationary, since there is thus eliminated any need for a rotary coupling to supply fluid under pressure to the cylinder.

The improved automatic draw bar mechanism described herein may be used in various ways, and the foregoing description is intended only to illustrate one application of my invention. For example, it will be understood that my draw bar mechanism may be used with a spindle of the type which is movable axially within the headstock of a machine tool. Therefore, while I have illustrated my invention in a preferred form I do not intend to be limited to that form, except insofar as the appended claims are so limited, since modifications coming within the scope of my invention will readily occur to others with my disclosure before them.

I claim:

1. In a machine tool of the type having a tapered spindle socket adapted to receive a tool holder having a similarly tapered shank and a knob member projecting rearwardly therefrom, the improvement comprising an automatic draw bar assembly including, in combination, a spindle having an axial bore therein including a tapered socket portion, a first straight cylindrical portion immediately rearwardly of the reduced end of said tapered portion, a frusto-conical shoulder adjacent the rear end of said first cylindrical portion, and a second straight cylindrical portion of reduced diameter relative to said first cylindrical portion and disposed immediately rearwardly of said shoulder, a split collet slidable within said axial bore and having a plurality of radially outwardly biased flexible fingers having enlarged head portions at the forward ends thereof, each of said enlarged head portions having a radially outer tapered surface adapted to cooperate with said frusto-conical shoulder for camming said head portion radially inwardly to a closed position and each head portion having a radially inner tapered surface adapted when in the closed position to engage against a rearwardly projecting knob on a tool holder which has been inserted in said spindle socket, a draw bar having its forward end secured to the rear of said collet for moving the latter axially between a forward position wherein said enlarged head portions are disposed forwardly of said frusto-conical shoulder and in their radially outer open positions so as to bear against said first cylindrical portion and a rearward position wherein said head portions are cammed radially inwardly by said shoulder and are free to move axially along said second straight cylindrical portion, and means for moving said draw bar axially to open and close said collet whereby when said draw bar is moved rearwardly said collet will engage the knob on a tool holder inserted in said spindle socket and pull the holder axially rearwardly into a seated position in said socket.

2. In a machine tool of the type having a tapered spindle socket adapted to receive a tool holder having a similarly tapered shank and a knob member projecting rearwardly therefrom, the improvement comprising an automatic draw bar assembly including, in combination, a spindle having a tapered socket portion and having a stepped bore disposed rearwardly of said tapered portion, a collet slidable axially in said bore and adapted to cooperate therewith whereby said collet will be opened when moved forwardly in said bore and will be closed about a projecting knob member on a tool holder disposed in said socket when said collet is moved rearwardly, a draw bar secured to said collet for moving the same axially whereby when said draw bar is moved rearwardly said collet will engage the knob on a tool holder inserted in said socket and pull the holder axially rearwardly into a seated position in said socket, a rotatable spring housing mounted over the rear end of said draw bar and substantially concentric with respect thereto, thrust bearing means associated with the forward end of said spring housing to permit the latter to rotate with said draw bar when said spindle is rotated, compression spring means disposed within said spring housing and adapted to act upon the rear end of said draw bar to bias the latter towards its rearward position, a stationary cylinder mounted to a fixed support and disposed rearwardly of said draw bar in axial alignment therewith, and a hydraulically actuated piston associated with said cylinder and normally spaced from the rear end of said draw bar, said piston being adapted upon actuation to engage said draw bar and move the same forwardly to open said collet.

3. In a machine tool of the type having a tapered spindle socket adapted to receive a tool holder having a similarly tapered shank and a knob member projecting rearwardly therefrom, the improvement comprising an automatic draw bar assembly including, in combination, a spindle having an axial bore therein including a tapered socket portion, a first straight cylindrical portion immediately rearwardly of the reduced end of said tapered portion, a frusto-conical shoulder adjacent the rear end of said first cylindrical portion, and a second straight cylindrical portion of reduced diameter relative to said first cylindrical portion and disposed immediately rearwardly of said shoulder, a split collet slidable within said axial bore and having a plurality of radially outwardly biased flexible fingers having enlarged head portions at the forward ends thereof, each of said enlarged head portions having a radially outer tapered surface adapted to cooperate with said frusto-conical shoulder for camming said head portion radially inwardly to a closed position and each head portion having a radially inner tapered surface adapted when in the closed position to engage against a rearwardly projecting knob on a tool holder which has been inserted in said spindle socket, a draw bar having its forward end secured to the rear of said collet for moving the latter axially between a forward position wherein said enlarged head portions are disposed forwardly of said frusto-conical shoulder and in their radially outer open positions so as to bear against said first cylindrical portion and a rearward position wherein said head portions are cammed radially inwardly by said shoulder and are free to move axially along said second straight cylindrical portion, a rotatable spring housing mounted over the rear end of said draw bar and substantially concentric with respect thereto, thrust bearing means associated with the forward end of said spring housing to permit the latter to rotate with said draw bar when said spindle is rotated, compression spring means disposed within said spring housing and adapted to act upon the rear end of said draw bar to bias the latter towards its rearward position whereby when said draw bar is moved rearwardly said collet will engage the knob on a tool holder inserted in said spindle socket and pull the holder axially rearwardly into a seated position in said socket, a stationary cylinder mounted to a fixed support and disposed rearwardly of said draw bar in axial alignment therewith, and a hydraulically actuated piston associated with said cylinder and normally spaced from the rear end of said draw bar, said piston being adapted upon actuation to engage said draw bar and move the same forwardly to open said collet.

4. In a machine tool of the type having a tapered spindle socket adapted to receive a tool holder having a similarly tapered shank and a knob member projecting rearwardly therefrom, the improvement comprising an automatic draw bar assembly including, in combination, a spindle having an axial bore therein including a tapered socket portion, a frusto-conical shoulder proximate the reduced end of said tapered portion, and a straight cylindrical bore portion disposed immediately rearwardly of said shoulder, a split collet slidable within said axial bore and having a plurality of radially outwardly biased flexible fingers having enlarged head portions at the forward ends thereof, each of said enlarged head portions having a radially outermost surface comprising a straight cylindrical segment so as to conform approximately to the configuration of said straight cylindrical bore and having an outer tapered surface extending rearwardly and radially inwardly from the rear end of said straight segment for cooperating with said frusto-conical shoulder for camming said head portion radially inwardly to a closed position, each head portion further having a radially inner tapered surface adapted when in the closed position to engage against a rearwardly projecting knob on a tool holder which has been inserted in said spindle socket, a draw bar having its forward end secured to the rear of said collet for moving the latter axially between a forward position wherein said enlarged head portions are disposed forwardly of said frusto-conical shoulder and in their radially outer open positions and a rearward position wherein said head portions are cammed radially inwardly by said shoulder and said radially outermost head surfaces are in slidable engagement with said straight cylindrical bore, and means for moving said draw bar axially to open and close said collet whereby when said draw bar is moved rearwardly said collet will engage the knob on a tool holder inserted in said spindle socket and pull the holder axially rearwardly into a seated position in said socket.

5. In a machine tool of the type having a tapered spindle socket adapted to receive a tool holder having a similarly tapered shank and a knob member projecting rearwardly therefrom, the improvement comprising an automatic draw bar assembly including, in combination, a spindle having a tapered socket portion and having a stepped bore disposed rearwardly of said tapered portion, a collet slidable axially in said bore and adapted to cooperate therewith whereby said collet will be opened when moved forwardly in said bore and will be closed about a projecting knob member on a tool holder disposed in said socket when said collet is moved rearwardly, a draw bar secured to said collet for moving the same axially whereby when said draw bar is moved rearwardly said collet will engage the knob on a tool holder inserted in said socket and pull the holder axially rearwardly into a seated position in said socket, a rotatable spring housing mounted over the rear end of said draw bar and substantially concentric with respect thereto, thrust bearing means associated with the forward end of said spring housing to permit the latter to rotate with said draw bar when said spindle is rotated, compression spring means disposed within said spring housing and adapted to act upon the rear end of said draw bar to bias the latter toward its rearward position, a stationary cylinder mounted to a fixed support and disposed rearwardly of said draw bar in axial alignment therewith, a hydraulically actuated piston associated with said cylinder and normally spaced from the rear end of said draw bar, said piston being adapted upon actuation to engage said draw bar and move the same forwardly to open said collet, and adjustable means for varying the normal spacing between said piston when in its rearward position and the rear end of said draw bar to thereby permit variation of the stroke imparted to said draw bar by said piston.

6. In a machine tool of the type having a tapered spindle socket adapted to receive a tool holder having a similarly tapered shank and a knob member projecting rearwardly therefrom, the improvement comprising an automatic draw bar assembly including, in combination, a spindle having an axial bore therein including a tapered socket portion, a first straight cylindrical portion immediately rearwardly of the reduced end of said tapered portion, a frusto-conical shoulder adjacent the rear end of said first cylindrical portion, and a second straight cylindrical portion of reduced diameter relative to said first cylindrical portion disposed immediately rearwardly of said shoulder, a split collet slidable within said axial bore and having a plurality of radially outwardly biased flexible fingers having enlarged head portions at the forward ends thereof, each of said enlarged head portions having a radially outermost surface comprising a straight cylindrical segment so as to conform approximately to the configuration of said first and second straight cylindrical portions and having an outer tapered surface extending rearwardly and radially inwardly from the rear end of said straight segment for cooperating with said frusto-conical shoulder for camming said head portion radially inwardly to a closed position, each head portion also having a radially inner tapered surface adapted when in the closed position to engage against a rearwardly projecting knob on a tool holder which has been inserted in said spindle socket, a draw bar having its forward end secured to the rear of said collet for moving the latter axially between a forward position wherein said enlarged head portions are disposed forwardly of said frusto-conical shoulder and in their radially outer open positions with said radially outermost surfaces bearing against said first straight cylindrical portion and a rearward position wherein said head portions are cammed radially inwardly by said shoulder and said radially outermost head surfaces are in slidable engagement with said second straight cylindrical portion, and means for moving said draw bar axially to open and close said collet whereby when said draw bar is moved rearwardly said collet will engage the knob on a tool holder inserted in said spindle socket and pull the holder axially rearwardly into a seated position in said socket.

7. In a machine tool of the type having a tapered spindle socket adapted to receive a tool holder having a similarly tapered shank and a knob member projecting rearwardly therefrom, the improvement comprising an automatic draw bar assembly including, in combination, a spindle having a tapered socket portion and having a stepped bore disposed rearwardly of said tapered portion, a collet slidable axially in said bore and adapted to cooperate therewith whereby said collet will be opened when moved forwardly in said bore and will be closed about a projecting knob member on a tool holder disposed in said socket when said collet is moved rearwardly, a draw bar secured to said collet for moving the same axially whereby when said draw bar is moved rearwardly said collet will engage the knob on a tool holder inserted in said socket and pull the holder axially rearwardly into a seated position in said socket, a rotatable spring housing mounted over the rear end of said draw bar and substantially concentric with respect thereto, thrust bearing means associated with the forward end of said spring housing to permit the latter to rotate with said draw bar when said spindle is rotated, compression spring means disposed within said spring housing and adapted to act upon the rear end of said draw bar to bias the latter toward its rearward position, and means for moving said draw bar forwardly against the force of said compression spring means to open said collet.

References Cited by the Examiner

UNITED STATES PATENTS 2,303,101  11/42  Williamson _____ 279—39
2,860,547  11/58  Stephan.
3,023,675  3/62   Stephan.

WILLIAM W. DYER, Jr., *Primary Examiner.*